United States Patent [19]

Smith

[11] Patent Number: 5,020,638
[45] Date of Patent: Jun. 4, 1991

[54] VEHICLE LIQUID DRIP CATCHING SYSTEM

[76] Inventor: Pok N. Smith, 11902 Loveland Pass, Houston, Tex. 77067

[21] Appl. No.: 446,802

[22] Filed: Dec. 6, 1989

[51] Int. Cl.⁵ .................................... F16N 31/00
[52] U.S. Cl. ............................ 184/106; 184/1.5; 220/573
[58] Field of Search ............... 184/1.5, 106; 220/1 C, 220/573, 571, 403; 206/204, 216, 223

[56] References Cited

U.S. PATENT DOCUMENTS

| | | | |
|---|---|---|---|
| 3,156,402 | 11/1964 | Dupuis | 206/204 |
| 3,757,990 | 9/1973 | Buth | 206/223 |
| 4,512,463 | 4/1985 | Ward | 206/223 |
| 4,762,155 | 8/1988 | Gruber | 184/1.5 |
| 4,801,005 | 1/1989 | Hahn et al. | 184/1.5 |
| 4,815,590 | 3/1989 | Peppiatt et al. | 206/204 |
| 4,872,420 | 10/1989 | Shepard | 220/403 |

*Primary Examiner*—Ira S. Lazarus
*Assistant Examiner*—Alan B. Cariaso
*Attorney, Agent, or Firm*—Alan R. Thiele

[57] ABSTRACT

A system for catching liquids dripping from the underside of a vehicle and disposal thereof includes a tray member, an absorbent pad and a bag assembly for containing the pad. When the absorbent pad becomes saturated with liquids, the mouth of the bag assembly is opened and the absorbent pad is placed therein. The soiled absorbent pad may then be disposed of.

16 Claims, 1 Drawing Sheet

VEHICLE LIQUID DRIP CATCHING SYSTEM

BACKGROUND OF THE INVENTION

The present invention relates to drip absorbing systems; more particularly, the present invention relates to systems which may be used for absorbing liquids which fall from vehicles or equipment.

Most engines or equipment which require lubrication or fluids for operation eventually start leaking these fluids in small amounts because of the wear on gaskets and the stresses on the metals resulting from long periods of operation. These small leaks of fluids may soil or stain garage or shop floors and leave an untidy appearance. Additionally, when the vehicle or equipment is moved away, workmen may walk through the drippings which lay on the shop floor and consequently, track oil or fluids into offices, spaces or in the passenger compartments of the vehicles.

In order to solve this problem, trays or absorbent materials are typically placed under the vehicle or machinery. When the trays become full of fluid, they must be cleaned before they can be returned to their positions under the vehicle or equipment in order to catch falling fluid.

When absorbent pads are placed under the vehicle or equipment, there is a need to conveniently dispose of the soiled or saturated pads. None of the prior art systems provide a means for conveniently handling and disposing of soiled pads. Accordingly, much of the oil, lubricant or cooling fluid which leaks from a vehicle or equipment may be transferred to the hands or clothing of the workman who is removing the pad and may be transferred back to the vehicle or to the shop floor if the pad is not removed carefully.

U.S. Pat. Nos. 2,990,033; 4,798,754 and 3,228,491 to Arnold, Tomek and Gatsos respectively describe an absorbent drip tray or mat; however, a convenient method for disposal of the soiled tray or mat is not provided.

U.S. Pat. Nos. 3,062,323 and 3,141,522 to Oganovic and Fitzpatrick respectively provide for a rigid drip absorbing system; however, no convenient method for disposal of the soiled trays is included.

U.S. Pat. No. 3,195,683 to Peterson et al. teaches an oil absorbing system which is designed for cleaning by burning off waste oil with fire. Such system would not be usable if the waste liquid was not a flammable liquid such as cooling fluid.

U.S. Pat. No. 4,392,552 to Partridge teaches only the design for a tray and does not address absorbing fluids.

There is, therefore, a need in the art to provide a system which not only absorbs oil, lubricants or cooling fluid from a vehicle or piece of equipment, but also provides a means for disposing of the soiled absorbent material in a neat and tidy manner.

SUMMARY OF THE INVENTION

A device for catching liquids which drip from the underside of a vehicle includes in its preferred embodiment three parts. The first part is a substantially rigid tray which is characterized by a base and upwardly emanating sides. Placed within the tray is an absorbent pad. The absorbency of the pad permits the retention of liquids which drip from the vehicle or machinery such as oil, grease, water, brake fluid or transmission fluid. In an alternative embodiment, the absorbent pad may include a liquid impervious backing. Attached to the absorbent pad is the third essential portion of the invention, a bag assembly. When the absorbent pad has become saturated with liquid or at any convenient time, the absorbent pad and bag assembly combination may be removed from the substantially rigid tray member. At that time, the mouth of the bag assembly need only be opened and the soiled absorbent pad placed therein. The bag is then closed and the bag with the soiled pad contained therein may be then disposed of.

BRIEF DESCRIPTION OF THE DRAWINGS

A better understanding of the vehicle liquid drip catching system may be had by reference to the drawings wherein.

BRIEF DESCRIPTION OF THE EMBODIMENTS

Figure 1:
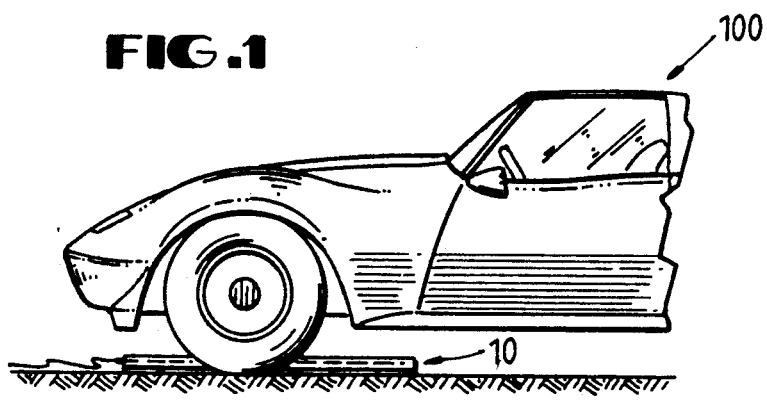
FIG. 1 is a side elevational view of a vehicle with the drip catching system of the present invention placed thereunder.

As may be shown in FIG. 1 the drip catching system of the present invention is placed under that area of a vehicle wherein drips usually occur. Specifically, the drip catching system of the present invention is shown under the engine area of a vehicle 100. While the system 10 of the present invention is shown under an automobile 100, it will be understood that the system may be used with trucks, buses or any piece of machinery or equipment whose operation results in the dripping of fluids.

Figure 2:
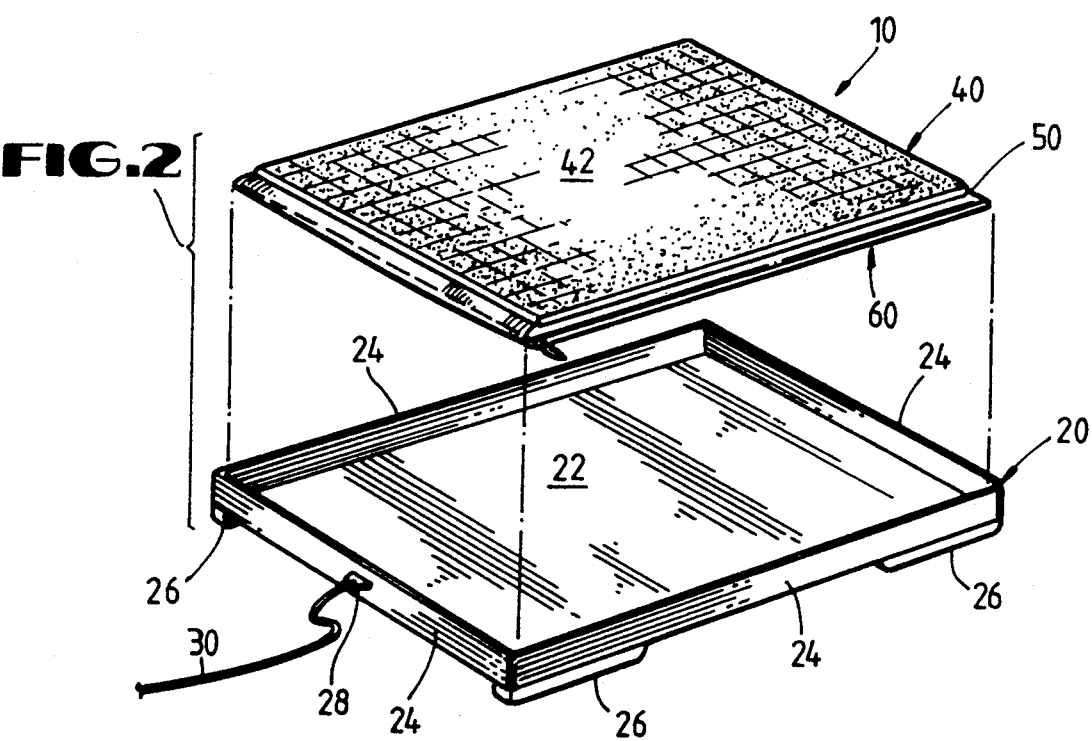
FIG. 2 is a exploded perspective view of the system of the present invention.
Figure 3:
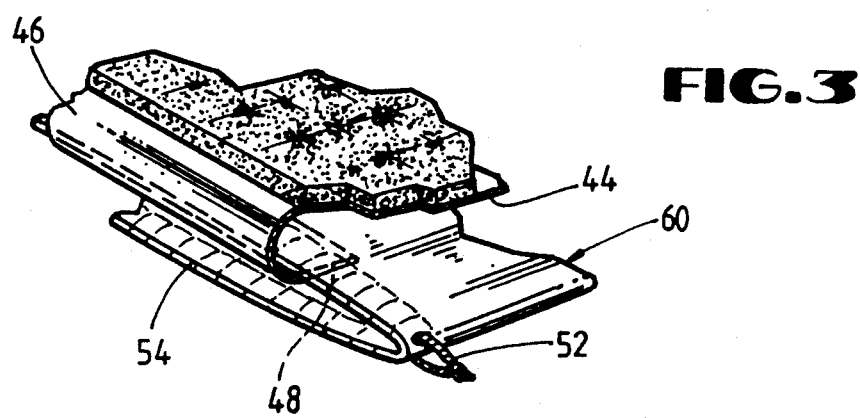
FIG. 3 is an enlarged perspective view of the assembly shown in FIG. 2.

In FIGS. 2 and 3, it may be seen that the device of the present invention consists of three essential parts. The first part is the tray assembly 20. Tray assembly 20 is characterized by a flat base 22. Emanating upwardly from the sides of the base 22 are sides 24. Tray assembly 20 may be placed under the vehicle by sliding it on skids 26. While skids 26 are shown in the preferred embodiment, it will be understood that skids 26 may be replaced by wheels or pads in order to facilitate the movement of tray assembly 20 across the ground. Removal of the tray assembly 20 from underneath the vehicle is facilitated by the use of a cord 30 which is attached to an eyelet 28.

The second essential element of the drip catching device of the present invention is the flexible absorbent pad assembly 40. Absorbent pad assembly 40 consists of an absorbent pad 42 which is sized to fit within tray assembly 20. In the preferred embodiment, absorbent pad assembly 40 includes a liquid impervious backing 44. It will be understood while liquid impervious backing 44 is shown in the preferred embodiment, the device of the present invention may be operated without liquid impervious backing 44.

Attached to the absorbent pad assembly 40 is bag assembly 60. Bag assembly 60 may be attached to absorbent pad assembly 40 by a seal 48 along the top of the bag assembly and seal 50 along the bottom of the bag assembly. While seal 48 shows backing 44 attached within bag assembly 60, it will be understood that other means of attaching absorbent pad assembly 40 to bag assembly 60 may be used without departing from the scope of the invention. Such means include attaching absorbent pad assembly 40 by a frangible seal to the outside of bag assembly 60. In order to provide operability of the device, seal 50 is a frangible seal so that when absorbent pad 40 becomes saturated with liquid, it may easily separated from bag assembly 60 and placed within the mouth of the bag assembly for easy disposal. Bag assembly 60 may include a drawstring 52 along the top for ease of disposal of soiled absorbent pads.

OPERATION

The drip collection system 10 of the present invention is operated by placing a new pad or a clean absorbent pad assembly 40 within tray assembly 20. Tray assembly 20 with absorbent pad assembly 40 contained therein is then slid under vehicle 100 as shown in FIG. 1. When the absorbent pad 42 of absorbent pad assembly 40 has become saturated with fluid, the tray assembly 20 is slid out from under vehicle 100 by pulling on cord 30. Bag assembly 60 is then separated from absorbent pad assembly 40 by breaking frangible seal 50. The mouth 54 of bag assembly 60 is then held open and the soiled absorbent pad assembly 60 is moved so as to fall within bag assembly 60.

In the preferred embodiment, backing 44 has an extension 46 which is attached by seal 48 within bag assembly 60. It will be understood that numerous types of seals may be used to attach absorbent pad assembly to bag assembly 60. Such assemblies would include a frangible seal between the upper portion of the absorbent pad assembly and the mouth 54 of the bag assembly. The key point is that when the absorbent pad assembly is soiled and saturated with liquid, it may be easily placed within bag assembly 60.

Once the soiled absorbent pad assembly has been placed within bag assembly 60, drawstring 52 may be pulled and the bag assembly may be closed. Once bag assembly 60 has been closed, the soiled pad may be neatly disposed of without soiling the hands of the user or the vehicles on the shop floor.

Tray assembly 20 may be fabricated from a variety of materials to include metal or plastic. The only key requirement is that tray assembly 20 be made of a rigid or semi-rigid material.

Absorbent pad assembly 40 may be made of a variety of materials, the only requirement being that pad assembly 40 be made of a material to absorb moderate quantities of liquid. As previously mentioned, absorbent pad assembly may or may not include a liquid impervious backing. It has been found that absorbent pads used to protect mattresses in hospitals exhibit the necessary characteristics.

Bag assembly 50 should be made of a liquid impervious material such as plastic, however, other liquid impervious materials may be used without departing from the scope of the invention.

There is thereby provided by the liquid catching device of the present invention a device and method for catching liquid dripping from vehicles and neatly disposing thereof.

While the device of the present invention is shown in reference to its preferred embodiment it will be understood by those skilled in the art that other embodiments of the present invention may be easily constructed without departing from the scope of the present invention.

We claim:

1. A device for catching liquids dripping from vehicles, said device comprising:
   a substantially rigid tray member having a base and substantially vertical sides emanating upwardly from the edges of the base;
   a flexible liquid absorbent pad constructed and arranged to fit within the substantially vertical sides of said substantially rigid tray member; and
   a bag assembly attached to one side of said flexible liquid absorbent pad so that said bag assembly is positioned entirely underneath said flexible liquid absorbent pad;
   whereby when said flexible liquid absorbent pad is saturated, said flexible liquid absorbent pads may be separated from said bag assembly and placed within said bag assembly for disposal.

2. The device as defined in claim 1 wherein said bag assembly includes a draw-string.

3. The device as defined in claim 2 wherein said bag assembly is made of plastic.

4. A device for catching liquids dripping from vehicles, said device comprising:
   a substantially rigid tray member having a base and substantially vertical sides emanating upwardly therefrom;
   a flexible liquid absorbent pad constructed and arranged to fit within said substantially vertical sides of said substantially rigid tray member;
   said flexible liquid absorbent pad further including a backing which is impervious to the passage of liquids;
   a bag assembly attached to said flexible liquid absorbent pad so that said bag assembly is positioned entirely underneath said flexible liquid absorbent pad; and
   whereby when said flexible liquid absorbent pad is saturated, said flexible liquid absorbent pad may be substantially separated from said bag assembly and place within said bag assembly for disposal.

5. The device as defined in claim 4 wherein said bag assembly has a drawstring.

6. The device as defined in claim 5 wherein said bag assembly is made of plastic.

7. The device as defined in claim 6 wherein said backing is constructed and arranged to attach to the inside of said bag assembly.

8. A disposable drip absorbing system for use within trays placed underneath vehicles, said system comprising:
   a flexible liquid absorbent pad constructed and arranged to fit within the tray placed under a vehicle;
   a bag assembly attached to one side of said flexible liquid absorbent pad so that said bag assembly is positioned entirely underneath said flexible flexible liquid absorbent pad; and
   whereby when said flexible liquid absorbent pad is saturated, said flexible liquid absorbent pad may be substantially separated from said bag assembly and placed within said bag assembly for disposal.

9. The disposal system as defined in claim 8 wherein said bag assembly includes a drawstring.

10. The disposal system as defined in claim 9 wherein said bag assembly is made of plastic.

11. A drip absorbing disposal system for use with trays placed underneath vehicles, said system comprising:
    a flexible flexible liquid absorbent pad constructed and arranged to fit within the tray placed under the vehicle;
    said flexible liquid absorbent pad further including a backing which is impervious to the passage of liquids;

a bag assembly attached to said flexible liquid absorbent pad so that said bag assembly is positioned entirely underneath said flexible flexible liquid absorbent pad; and whereby when said flexible liquid absorbent pad is saturated, said flexible liquid absorbent pad may be substantially separated from said bag assembly and placed within said bag assembly for disposal.

12. The system as defined in claim 11 wherein said bag assembly has a drawstring.

13. The system as defined in claim 12 wherein said bag is made of plastic.

14. The system as defined in claim 13 wherein said backing is constructed and arranged to attach to the inside of said bag assembly.

15. A method for disposing of liquids dripping from a vehicle, said method comprising the steps of:

attaching a bag assembly to the back of a flexible liquid absorbent liquid absorbent pad so that said bag assembly is positioned entirely underneath said flexible liquid absorbent pad;

placing said flexible liquid absorbent pad and said bag assembly underneath the vehicle;

removing said flexible liquid absorbent pad and said bag assembly from underneath said vehicle when said flexible liquid absorbent pad is saturated.

substantially separating said flexible liquid absorbent pad from said bag assembly; and placing said saturated absorbent flexible liquid absorbent pad in said bag assembly.

16. The method as defined in claim 15 further including the step of placing a liquid impervious backing on said flexible absorbent pad.

* * * * *